Figures 1, 2:
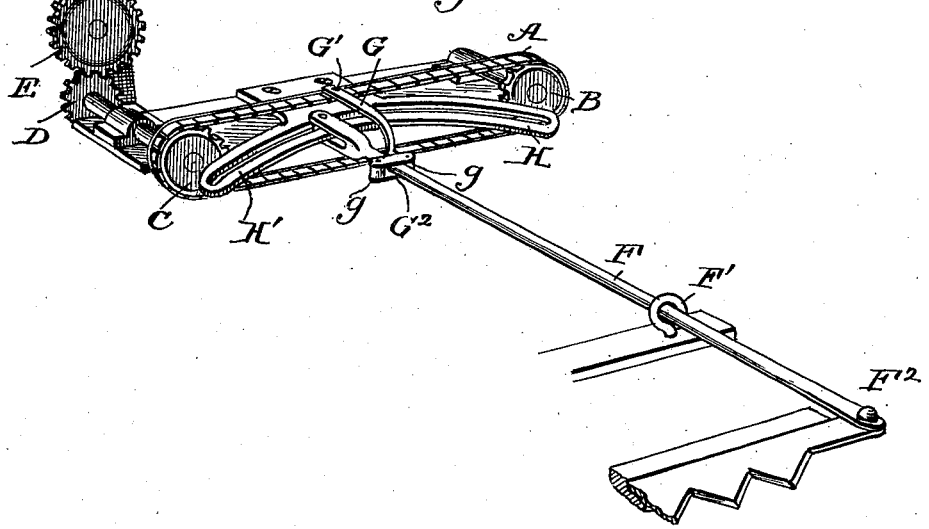

No. 691,644.  
E. A. MAINGUET.  
MECHANICAL MOVEMENT.  
(Application filed Apr. 30, 1901.)  
(No Model.)  
Patented Jan. 21, 1902.

WITNESSES:

INVENTOR  
Edward A. Mainguet.  
BY  
ATTORNEYS

UNITED STATES PATENT OFFICE.

EDWARD A. MAINGUET, OF EVANGELINE, LOUISIANA.

MECHANICAL MOVEMENT.

SPECIFICATION forming part of Letters Patent No. 691,644, dated January 21, 1902.

Application filed April 30, 1901. Serial No. 58,112. (No model.)

*To all whom it may concern:*

Be it known that I, EDWARD A. MAINGUET, of Evangeline, in the parish of Acadia and State of Louisiana, have invented a new and Improved Mechanical Movement, of which the following is a specification.

My invention is an improvement in mechanism which, while it is preferably adapted and designed for operating the cutter-bar of a mower or reaper, is capable of a more general application and of use wherever it is desired to transmit motion to a reciprocating part by means of an endless belt; and the invention consists in certain novel constructions and combinations of parts, as will be hereinafter described and claimed.

In the drawings, Figure 1 is a perspective view of an apparatus embodying my invention, and Fig. 2 is a detail sectional view illustrating the rear fork of the lever and its connection with the curved guide.

In carrying out my invention I provide a belt A, preferably in the form of a sprocket-chain passing around sprocket-wheels B and C, the latter being driven by any means known and preferably by means of the toothed gears D and E, as shown in Fig. 1. The lever F fulcrums at F' and is designed to operate a bar or any other device connected with its end $F^2$, and by this means the lever can be connected directly with the cutter-bar, and as the latter reciprocates in a straight line it will be necessary for the end $F^2$ of the lever F to also move in a straight line back and forth. To permit this, I arrange the fulcrum to permit the sliding of the lever in the direction of its length, preferably by passing the lever through an opening, which may be the eye of a suitable bolt, as shown in Fig. 1. The rear end of the lever F moves back and forth at an equal distance between the upper and lower runs of the belt A and in a plane with a line drawn through the axes of the sprocket-wheels B and C, driving by this means the end $F^2$ in the same imagined plane as the one passing by the centers of the fulcrum and the axes of the sprocket-wheels B C. I also provide means for guiding the rear end of the lever F to cause its front end $F^2$ to travel in a straight line, as before described. To obtain this, I choose, preferably, a plate H, having a slot H' curved to properly guide the lever, which has a roller $f$, carried by the fork $f'$ at the rear end of the lever, as best shown in Fig 2. The plate H extends between the upper and lower runs of the sprocket-belt and in a plane in line with the axes of the wheels B and C, as best shown in Fig. 1, having the ends of the slot H' far enough to permit the motion of the lever when the bar G is passing around the sprocket-wheels and maintaining the rear end of the lever in line between said axes and also operating it longitudinally to secure the straight-line movement of the front end of the lever, as before described.

To operate the lever, I provide means extending between the said lever and the belt A, so that the movements of the latter can be imparted to the lever to swing its rear end back and forth. This is preferably accomplished by means of a bar G, secured at one end at G' to the belt A and arranged at its other end $G^2$ for engagement with the lever. This is preferably effected by providing the outer end $G^2$ of the bar G with a box or loop to fit over the lever F and having antifriction-rolls $g$ operating on opposite sides of the lever, as shown in Fig. 1.

It will be noticed that the bar G is deflected sufficiently to bring its end $G^2$ into the plane of a line drawn between the axes of the wheels B and C and the center of the fulcrum F', so that it will properly operate the lever, which is arranged and rocks as before described.

Having thus described my invention, what I claim, and desire to secure by Letters Patent, is—

1. An apparatus substantially as described comprising the sprocket belt or chain, its supporting and driving wheels, a rocking lever arranged at one end to operate in a plane between the runs of the belt, and a bar held to the belt and deflected thence inwardly and engaged with the lever whereby to operate the same by the movement of the belt, substantially as set forth.

2. In an apparatus substantially as described, the combination of a belt, the rocking lever movable longitudinally, and a slotted plate holding one end of the lever and causing it to reciprocate in a straight line, by its guide forcing the lever to have a straight-line movement at its other end, and the bar projecting from the belt and deflected inwardly with its inner end engaged with the lever substantially as set forth and permitting its course around the sprocket-wheels.

3. The combination of the belt and its supporting and operating devices, the guide-plate extending between the runs of the belt and having a curved guide-slot, the rocking lever having a sliding fulcrum and provided at its swinging end with means engaging in the slot of the guide-plate, and the bar connected at one end to the belt and engaged at its other end with the lever substantially as set forth.

4. The combination substantially as described, of the sprocket-belt, the sprocket-wheels supporting the same, the rocking lever arranged to swing back and forth between the runs of the belt and between its supporting-sprockets, and the bar secured at one end to the sprocket-belt and provided at its other end with a box or loop embracing the lever F substantially as set forth.

5. The improved apparatus herein described, consisting of the sprocket-belt, the pinions supporting the same, the curved guide-plate extending between the runs of the belt and in a line with the axes of the pinions, the lever having a sliding fulcrum and engaged at its swinging end with the curved guide-plate, and the bar secured at one end to the sprocket-belt and deflected inwardly toward its opposite end and provided at such end with a box or loop embracing the lever, all arranged and adapted for use, substantially as set forth.

6. An apparatus substantially as described, comprising the belt, its supporting and driving devices, a lever pivoted outside the space between the runs of the said belt, and arranged at one end to swing back and forth in the plane of the space between the runs of the belt, and devices between the belt and the lever, whereby the movement of the belt will operate to swing the pivoted lever back and forth, substantially as set forth.

EDWARD A. MAINGUET.

Witnesses:
CHAS. R. CLINE,
CHARLES PLAYFORD.